June 7, 1960 K. SIEBENTHAL ET AL 2,939,249
MEANS FOR CENTERING HOT GLASS PARISONS
Filed Nov. 21, 1955 2 Sheets-Sheet 2
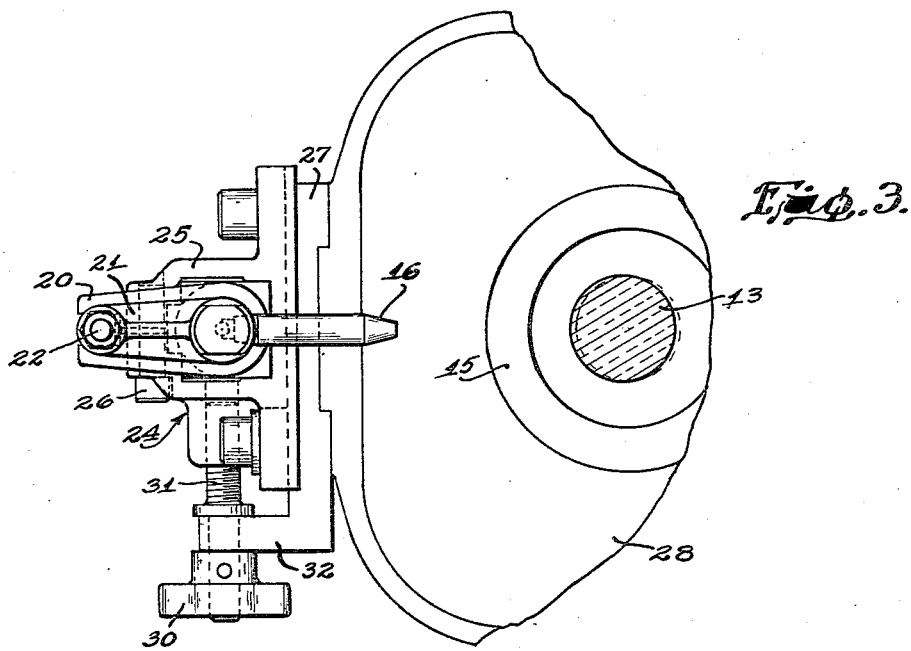
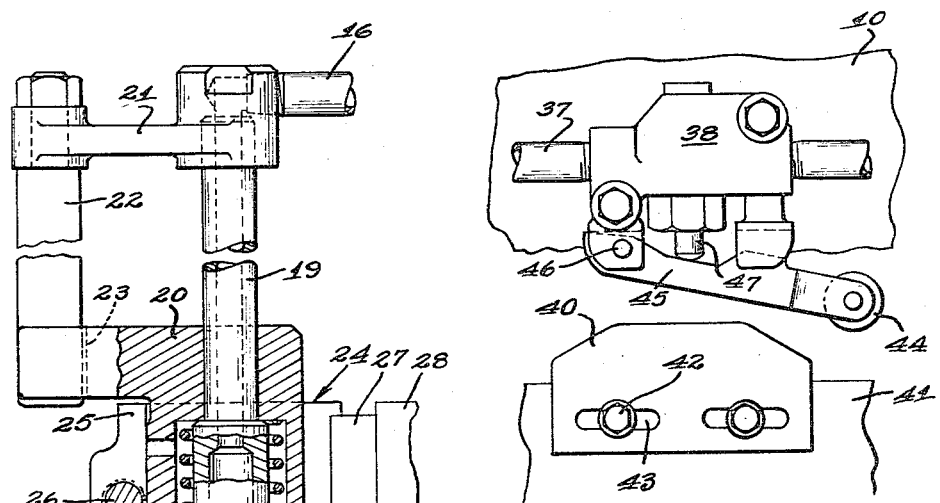
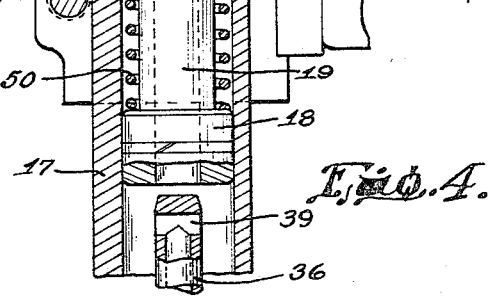
INVENTORS.
K. SIEBENTHAL
A. S. JACKSON
BY
ATTORNEYS

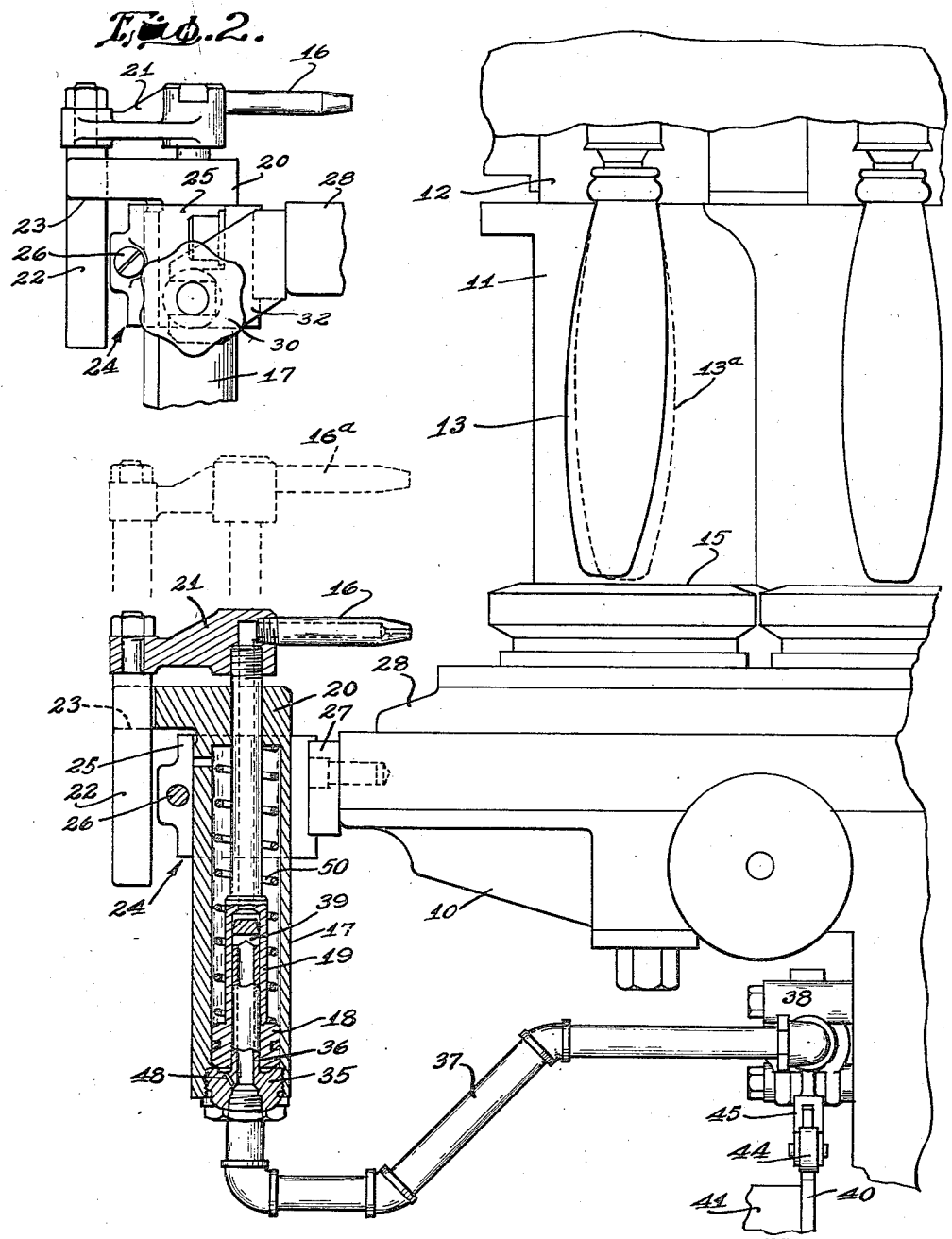

United States Patent Office 2,939,249
Patented June 7, 1960

2,939,249

MEANS FOR CENTERING HOT GLASS PARISONS

Kirby Siebenthal and Albert S. Jackson, Toledo, Ohio, assignors to Owens-Illinois Glass Company, a corporation of Ohio Filed Nov. 21, 1955, Ser. No. 548,070

3 Claims. (Cl. 49—9)

Our invention relates to machines for molding glass articles and provides novel means for use with and as forming a part of a glass molding machine of the type in which molten glass is formed into a parison within a parison mold, the mold being then opened leaving the parison suspended from a neck ring or mold, the parison thereafter being blown to finished form within a finishing mold which is closed around the suspended parison. In this type of machine the molds are commonly mounted on a rotating mold carriage and there is a tendency for the suspended parisons to be swung out of a vertical position by centrifugal force, and also by more or less one-sided chilling and contraction of the suspended parison.

The present invention comprises improved means for straightening or centetring a suspended parison. The invention in its preferred form provides an air-operated cylinder by which a blowing nozzle is automatically lifted and lowered into and out of a blowing position opposite the suspended parison. Automatic means are provided for opening the blowing nozzle to an air pressure line when the nozzle is lifted to operative position and for cutting off the pressure air supply as the nozzle is lowered.

Other features of the invention and the precise nature thereof will appear more fully hereinafter in connection with the following detailed description.

Referring to the accompanying drawings:

Fig. 1 is a fragmentary elevational view of a glass blowing machine to which the present invention is applied, the operating cylinder for the nozzle being shown in section;

Fig. 2 is a detail view showing the nozzle and adjusting means therefor;

Fig. 3 is a plan view showing the air nozzle and its mounting, also showing a parison in section;

Fig. 4 is a part sectional elevation with parts broken away showing the air cylinder and piston with the nozzle in its operative position; and Fig. 5 is a detail plan view of a valve in the air pressure line and a cam for operating the valve.

Referring particularly to Fig. 1, the machine comprises a mold carriage 10 which is mounted for rotation about a vertical axis and on which are mounted mold units which may be arranged in an annular series around the axis of rotation. Each mold unit comprises a parison mold (not shown), a neck ring or mold 12, and a finishing mold 11. Charges of molten glass are introduced into the combined parison mold and neck mold and the blank or parison 13 is formed therein. The parison mold, which is made in partible sections is then opened leaving the blank or parison 13 suspended from the neck mold 12. The finishing mold 11 is then closed around the depending parison and the latter is blown to its finished form. The mechanism for thus forming the article is well known in the prior art.

The parison 13 when first formed is vertical as indicated by broken lines 13ª (Fig. 1) and centered over the mold bottom plate 15. When the parison mold opens the parison which is in a hot plastic condition tends to swing to the full line position under the influence of centrifugal force and also uneven chilling of the parison. The present invention provides means for returning the parison to its centered position over the mold bottom 15 and with respect to the finishing mold immediately preceding the closing of the finishing mold around the parison. Such means includes a blowing nozzle 16 and an air cylinder 17 by which the nozzle is lifted and lowered.

The cylnder 17 is attached to the mold carriage 10 for rotation therewith. The piston 18 within the cylinder 17 is formed integral with a tubular piston rod 19 which extends upwardly through the cylinder head 20 and is slidable up and down therein. The piston rod 19 has a screw-threaded connection at its upper end with a block 21 to which the nozzle 16 is also connected, the tubular rod 19 being open to the nozzle through the block 21. A vertical guide bar 22 attached to the block 21 is slidable up and down in a guideway 23 formed in an extension of the cylinder head 20.

Means connecting the cylinder 17 to the carriage 10 includes a bracket 24 formed with a split collar 25 surrounding the cylinder 17 and clamped thereto by a clamping bolt 26. This construction permits vertical adjustment of the cylinder. The bracket 24 is slidably mounted for horizontal adjustment lengthwise on a guide bar 27 attached to the mold shoe 28. An adjusting knob 30 (Fig. 3) is keyed to an adjusting screw 31 threaded in the bracket 24 for adjusting the cylinder, the shaft 31 being journalled in an arm 32 formed on the bar 27.

The lower end of the cylinder 17 is closed by a head 35. A tubular center pin 36 formed integral with the head 35 extends upwardly through the piston 18 and telescopes with the tubular piston rod 19. Air under pressure is supplied to the cylinder 17 through an air pressure pipe line 37. This line is periodically opened and closed by a valve 38 (Figs. 1 and 5) mounted on the rotating mold carriage. The valve is actuated by a cam 40 which is attached to the stationary machine base 41 by clamping bolts 42 extending through elongated slots 43 in the cam to permit lengthwise adjustment of the cam. A cam follower roll 44 is carried on a rock arm 45 connected by a pivot 46 to the valve 38 and engaging a pin 47 for operating the valve.

The operation is as follows: As the mold carriage rotates, the valve 38 in the air pressure line is brought into position to be opened by the cam 40 substantially at the time the parison mold is opened to leave the parison 13 suspended from the neck mold 12. The air pressure thus supplied to the cylinder 17 is transmitted through a port 48 (Fig. 1) and moves the piston 18 and piston rod 19 upwardly, thus lifting the nozzle 16 to operative position 16ª shown in broken lines. As the nozzle approaches its uppermost position the piston 18 is carried above the upper end of the center pin 36 as shown in Fig. 4. A transverse bore 39 in the pin 36 is thus opened into the cylinder 17 and opens the air pressure line through the tubular piston rod to the nozzle 16. A jet of air is thus directed against the parison and swings it to the vertical position 13ª in which it is centered over the mold bottom plate 15 while the finishing mold closes around the parison. When the cam follower roll 44 runs off the cam the air valve 38 is again closed, cutting off the pressure and opening the line 37 to atmosphere. The nozzle 16 is then lowered by the compression spring 50, the air beneath the piston 18 being exhausted through the line 37 and valve 38.

Although a single blowing device is herein shown and described in detail, it will be understood that one such blowing device is provided for each of the mold units, all of such blowing devices being under the control of the single stationary cam 40.

Modifications may be resorted to within the spirit and scope of our invention.

We claim:

1. A machine for molding glass articles comprising a mold carriage, a vertical cylinder mounted thereon, a tubular piston and piston rod within said cylinder defining a central passage, the piston rod extending above the cylinder, a nozzle connected to the piston rod and communicating with said passage, an air pressure line extending to the lower end of the cylinder, a cylinder head at said lower end, a tubular center pin connected to and extending upwardly from said head through the piston and into said central passage in telescopic connection with said tubular piston rod, said telescopic connection blocking air supply to said nozzle, means for controlling a supply of air under pressure through the pressure line and cylinder head for moving the piston and piston rod upwardly and carrying the nozzle upward to operative position, said center pin being of such length that it is separated from the piston when the latter is in its upward position, thereby connecting the air pressure from said line to the cylinder and thence to said central passage and supplying air pressure to the nozzle.

2. The apparatus defined in claim 1, the means for controlling the supply of air under pressure comprising a valve on the mold carriage, a stationary cam for effecting the opening and closing of the valve, and spring means within the cylinder for returning the nozzle and piston to their lowered position when the valve is closed to re-establish the telescopic connection between the tubular piston rod and tubular center pin to cut off the pressure to said nozzle.

3. A machine for molding glass articles having a mold carriage rotatable about an axis, a neck mold thereon for suspending a parison of plastic glass with the parison depending from and unsupported below the neck mold, the combination therewith of a vertical cylinder mounted on the carriage, a tubular piston and piston rod within the cylinder, said rod extending upwardly above the cylinder, a laterally directed nozzle connected to the piston rod, an air pressure line extending to the cylinder and through which air pressure is supplied beneath the piston for moving the piston upwardly and thereby lifting the nozzle from an inoperative position to an operative position at the side of the parison opposite from said axis and with the nozzle directed toward the lower unsupported portion of the suspended parison, a tubular center pin mounted to extend upwardly into the cylinder and having a telescopic connection within the tubular piston rod, said telescopic connection normally blocking communication between the tubular center pin, the cylinder and the tubular piston rod, a fluid connection between the pressure line and the tubular center pin for conducting air pressure into said center pin, a valve in said pressure line, a stationary cam, means operated by said cam for opening the valve when the carriage reaches a predetermined position of rotation thereby actuating the piston, the piston being brought to a position to establish a flow of air pressure from the center pin to the cylinder and to the tubular piston rod when the nozzle approaches its operative position and thereby supply air pressure to the nozzle.

References Cited in the file of this patent

UNITED STATES PATENTS

| | | |
|---|---|---|
| 458,190 | Ripley | Aug. 25, 1891 |
| 791,410 | Fetters | May 30, 1905 |
| 1,299,482 | La France | Apr. 8, 1919 |
| 1,484,888 | Johnson | Feb. 26, 1924 |
| 1,557,850 | La France | Oct. 20, 1925 |
| 1,607,607 | Cramer | Nov. 23, 1926 |
| 1,869,920 | Soubier | Aug. 2, 1932 |
| 2,178,226 | Diels | Oct. 31, 1939 |
| 2,329,136 | Poglein | Sept. 7, 1943 |